United States Patent
Mostafa et al.

(10) Patent No.: US 8,966,095 B2
(45) Date of Patent: Feb. 24, 2015

(54) NEGOTIATE MULTI-STREAM CONTINUOUS PRESENCE

(75) Inventors: Adel Mostafa, Toronto (CA); Trung Tran, Wylie, TX (US); William Janning, Allen, TX (US); Patrick Ma, Plano, TX (US)

(73) Assignee: Avaya Inc., Basking Ridge, NJ (US)

( * ) Notice: Subject to any disclaimer, the term of this patent is extended or adjusted under 35 U.S.C. 154(b) by 237 days.

(21) Appl. No.: 13/542,930

(22) Filed: Jul. 6, 2012

(65) Prior Publication Data

US 2013/0010049 A1 Jan. 10, 2013

Related U.S. Application Data

(60) Provisional application No. 61/505,911, filed on Jul. 8, 2011.

(51) Int. Cl.
H04L 29/06 (2006.01)
H04N 7/15 (2006.01)

(52) U.S. Cl.
CPC .............. *H04N 7/15* (2013.01); *H04L 65/4084* (2013.01)
USPC ....................................................... 709/227

(58) Field of Classification Search
USPC ......... 709/227, 204; 370/352, 254; 348/14.02
See application file for complete search history.

(56) References Cited

U.S. PATENT DOCUMENTS

| | | | |
|---|---|---|---|
| 5,880,728 A | 3/1999 | Yamaashi et al. | |
| 2005/0157660 A1* | 7/2005 | Mandato et al. | 370/254 |
| 2006/0200518 A1 | 9/2006 | Sinclair et al. | |
| 2009/0040289 A1 | 2/2009 | Hetherington et al. | |
| 2009/0055473 A1* | 2/2009 | Synnergren | 709/204 |
| 2009/0116477 A1* | 5/2009 | Belling et al. | 370/386 |
| 2009/0290573 A1* | 11/2009 | Belling et al. | 370/352 |
| 2011/0181682 A1* | 7/2011 | Belling et al. | 348/14.02 |
| 2012/0278384 A1* | 11/2012 | Synnergren et al. | 709/203 |
| 2014/0040485 A1* | 2/2014 | Mandato et al. | 709/227 |

FOREIGN PATENT DOCUMENTS

| | | |
|---|---|---|
| DE | 60302561 | 6/2006 |
| EP | 1578129 | 9/2005 |
| EP | 1958443 | 8/2008 |
| GB | 2439691 | 1/2010 |

(Continued)

OTHER PUBLICATIONS

Official Action (with partial English translation) for German Patent Application No. 102012013336.7 dated Apr. 12, 2013, 11 pages.

(Continued)

*Primary Examiner* — Mohammad Islam
(74) *Attorney, Agent, or Firm* — Sheridan Ross P.C.

(57) ABSTRACT

Described are embodiments for allowing the negotiation of a continuous presence layout. Specifically, in embodiments, an offer is generated by a client that includes attributes for displaying continuous presence video information. The attributes include, in some embodiments, one or more window identifiers, one or more bandwidth limit identifiers, one or more group numbers, and/or one or more ranks. The offer is sent to a server which transmits an answer to the offer. Once the attributes for the continuous presence layout has been negotiated, the server uses the attributes to format video content sent to the client.

20 Claims, 13 Drawing Sheets

(56) References Cited

FOREIGN PATENT DOCUMENTS

JP      2011-082867     4/2011
WO     WO 2007/067236   6/2007

OTHER PUBLICATIONS

Bradner "Key words for use in RFCs to Indicate Requirement Levels," Network Working Group, RFC 2119, Mar. 1997, 4 pages.
Rosenberg et al. "SIP: Session Initiation Protocol," Network Working Group, RFC 3261, 270 pages, Jun. 2002.
Rosenberg et al. "An Offer/Answer Model with the Session Description Protocol (SDP)," Network Working Group, RFC 3264, Jun. 2002, 26 pages.
Wenger et al. "RTP Payload Format for Scalable Video Coding," Internet Engineering Task Force, RFC 6190, May 2011, 101 pages.
Combined Search and Examination Report for United Kingdom Patent Application No. GB1212036.6, dated Jan. 9, 2013, 8 pages.
Examination Report for United Kingdom Patent Application No. GB1212036.6, dated Aug. 23, 2013 5 pages.

* cited by examiner

```
Offer SDP: for simplicity, audio is not shown
v=0
o=svcsrv 289083124 289083124 IN IP4 192.168.1.2
s=Design Review Conference
t=0 0
b=TIAS:812000 m=video 30000 RTP/AVP 98 97 96
c=IN IP4 192.168.1.2
a=content:window1,1,25,1
b=TIAS:512000
a=rtpmap:96 H264/90000
a=fmtp:96 profile-level-id=42401e
a=rtpmap:97 H264-SVC/90000
a=fmtp:97 profile-level-id=530016; sprop..info..(VGA/30)
a=rtpmap:98 H264-SVC/90000
a=fmtp:98 profile-level-id=53001e; sprop..info..(720p/30)
a=sendrecv m=video 40000 RTP/AVP 101 100 99
c=IN IP4 192.168.1.2
a=content:window2,2,50,1
b=TIAS:300000
a=rtpmap:99 H264/90000
a=fmtp:99 profile-level-id=42401e
a=rtpmap:100 H264-SVC/90000
a=fmtp:100 profile-level-id=530013; sprop..info..(VGA/30)
a=rtpmap:101 H264-SVC/90000
a=fmtp:101 profile-level-id=530016; sprop..info..(360/30)
a=recvonly
```

*Fig. 3*

```
Answer SDP:
v=0
o=svcsrv2 289083555 289083555 IN IP4 192.168.1.3
s=Design Review Conference
t=0 0
b=TIAS:662000 m=video 33000 RTP/AVP 98
c=IN IP4 192.168.1.3
a=content:window1,1,25,1
b=TIAS:512000
a=rtpmap:98 H264-SVC/90000
a=fmtp:98 scalable-layer-id=6
a=sendrecv m=video 43000 RTP/AVP 100
c=IN IP4 192.168.1.3
a=content:window2,2,50,1
b=TIAS:150000
a=rtpmap:100 H264-SVC/90000
a=fmtp:100 scalable-layer-id=1
a=sendonly
```

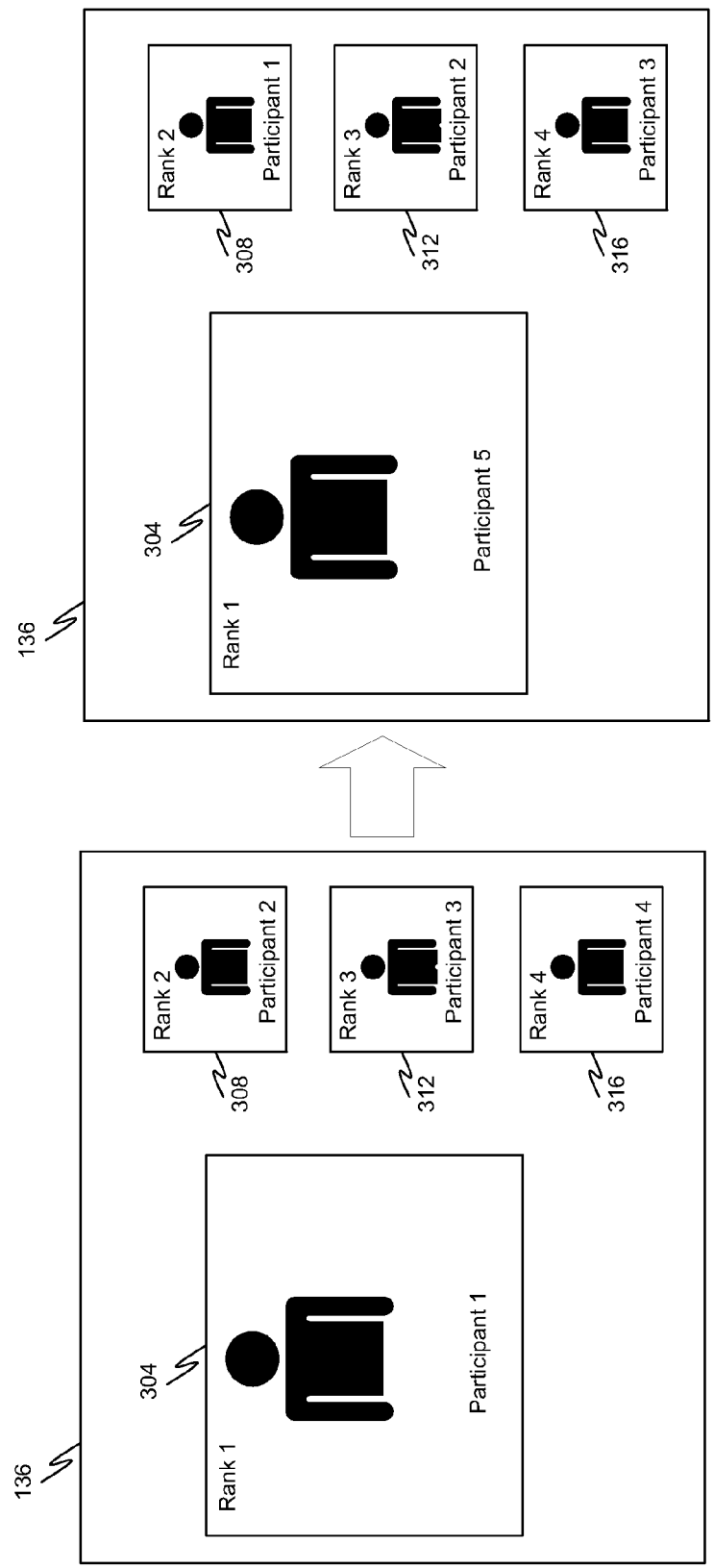

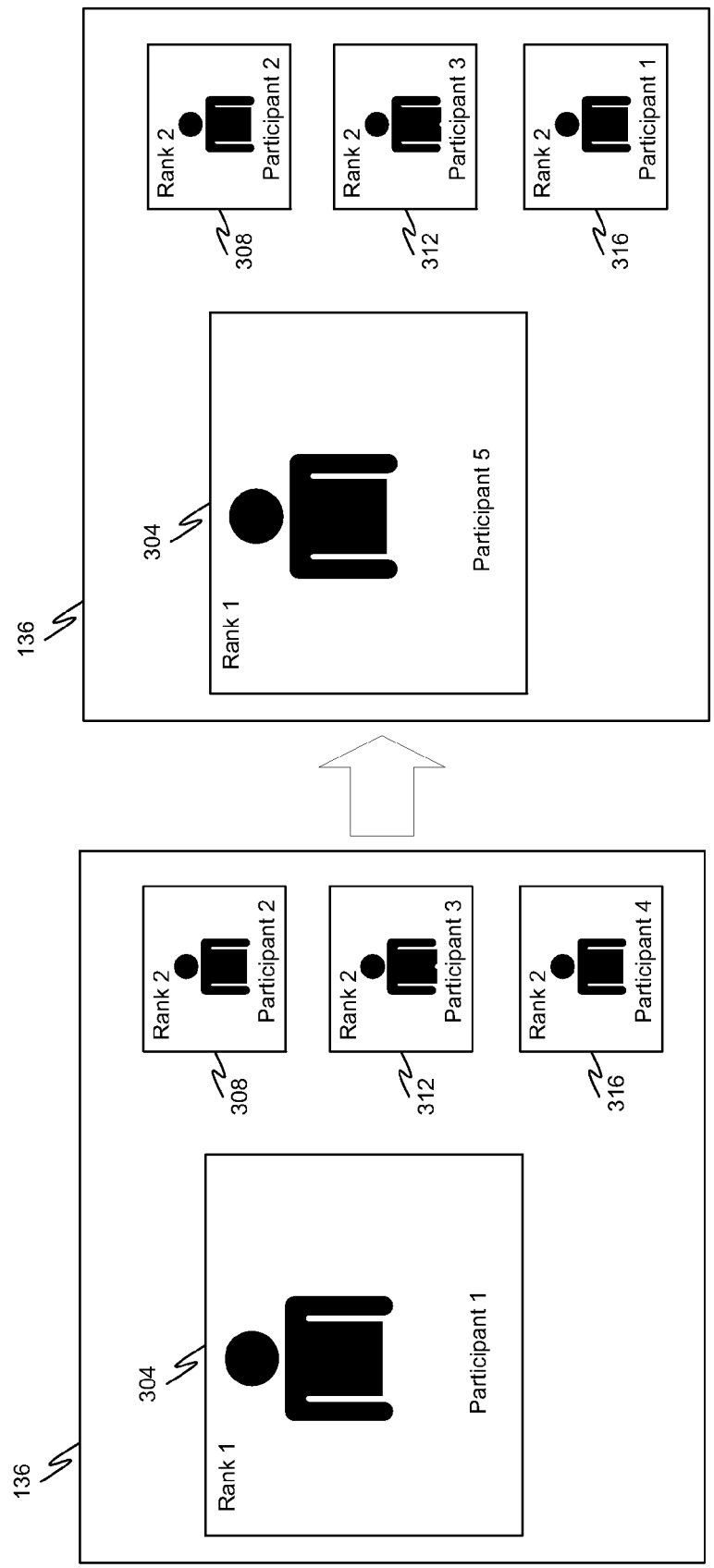

NEGOTIATE MULTI-STREAM CONTINUOUS PRESENCE

CROSS-REFERENCE TO RELATED APPLICATIONS

This application claims priority to U.S. Provisional Patent Application No. 61/505,911, entitled, MECHANISM TO NEGOTIATE MULTI-STREAM BASED CONTINUOUS PRESENCE (CP) VIDEO IN SIP FOR A REQUIRED USER EXPERIENCE (UX), filed on Jul. 8, 2011, and hereby Incorporated by reference in its entirety as if set forth herein in full.

BACKGROUND

Videoconferencing is a very powerful communication mode that allows people to be in remote locations and be able to see and speak to each other in real time. Typically, a video conference session is established by a client device (located at an endpoint where a participant will join) establishing a session with a conference server. Establishing a session between the client and the conference server can occur using a number of different protocols including, the Session Description Protocol (SDP), Session InitiationProtocol (SIP), and Real-Time Transport Protocol (RTP).

Once a session is established between the client and the conference server, video and audio is transmitted from each of the clients involved in the conference to the conference server. The conference server will then combine the video streams and transmit them to the clients for output at the client. The server typically controls the resolution of the video received by the client and changes the resolution based on bandwidth constraints, without any input from the client or consideration of the user experience on the client.

Although specific problems and issues have been identified in this background section, the embodiments described herein are not limited to solving these particular problems or issues. The embodiments may be applied to solve problems not described in this background section.

SUMMARY

It is with respect to the above issues and other problems that the embodiments presented herein were contemplated. Embodiments described in the present application provide for a client to negotiate attributes that affect a user experience during a multimedia session, such as a video conference. The client can negotiate attributes that affect, for example, the layout of continuous presence information displayed to a user, the video resolution of displayed information, shuffling of windows during the video conference, and the like.

In one embodiment, a method is provided that includes generating an offer, and indicating in the offer, window content specification, e.g., first window identifier for a first and second window, a bandwidth limit identifier for the first and second window, and a group identifier for the first and second window. The offer is then transmitted, e.g., to a conference server. An answer to the offer is then received. In some embodiments, the offer, and answer, is formatted according to a Session Description Protocol (SDP). After the answer is received, video content is received for displaying in the first window and the second window.

In embodiments, window content specification includes a first group identifier that is assigned a higher priority than a second group identifier. The higher priority indicates that resolution reductions should be applied to content for display in windows of the second group before resolution reductions are applied to content for display in windows in the first group. In embodiments, the first bandwidth limit identifier indicates a limit for reducing the resolution of video content for display in windows of the first group. The first bandwidth limit identifier may indicate a percentage of an original resolution for the window.

In some embodiments, in addition to the other identifiers, the offer includes a first rank identifier for the first window and/or a second rank identifier for the second window. The rank identifiers are used to control the shuffling of windows displaying continuous presence information to a user. For example, if a user is participating in a video conference, the rank can control the display of active speakers within various windows. In embodiments, the first window has a rank such that the most recent active speaker is displayed in the first window. Similarly, the second window can be ranked such that the second most recent active speaker is displayed. In some embodiments, a window can be ranked so that they are pinned, meaning that the same participant is always displayed in the window. In yet other embodiments, the shuffling of the windows that result from speakers coming in and out is minimized.

Another embodiment is directed to a communication device, e.g., a conference server, which includes a non-transitory computer readable medium, a processor, and an application stored in the computer readable medium and running on the processor. The application receives an offer for a multimedia communication session, the offer including, in embodiments, a first window identifier for a first window, a bandwidth limit identifier for the first window, a first group identifier for the first window, a second window identifier for a second window, a second bandwidth limit identifier for the second window, and a second group identifier for the second window. In embodiments, the application transmits an answer in response to receiving the offer. The answer in the offer are formatted according to SDP, some embodiments. The application then transmits video content for displaying in the first window and the second window. In some embodiments, the application reduces the resolution of video content, in response to a bandwidth constraint. The resolution reduction is based on the group identifier as well as the bandwidth limit identifier received in the offer. For example, the first group identifier may, in embodiments, have a lower priority than the second group identifier, in which case the resolution of video for display on windows associated with the first group identifier is reduced, up to the first bandwidth limit, before the resolution of video for display on windows associated with the second group identifier is reduced.

Other embodiments are directed to computer readable medium including computer executable instructions stored onto the computer readable medium which, when executed by one or more processors of a computer, causes the computer to perform a method for negotiating a multimedia session. The method includes generating an offer for a multimedia communication session. The offer includes in embodiments a plurality of window identifiers for a plurality of windows, a bandwidth limit identifier for each of the plurality of windows, and a group identifier for each of the plurality of windows, wherein a first group identifier for a first portion of the plurality of windows is different than a second group identifier for a second portion of the plurality of windows. The offer is then transmitted to a server. An answer to the offer is received from the server, and video content for displaying in the plurality of windows is received from the server.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, embodiments are considered to include a tangible storage medium and prior art-recognized equivalents and successor media, in which the software implementations of the embodiments are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while exemplary embodiments are described, it should be appreciated that individual aspects of the embodiments can be separately claimed.

BRIEF DESCRIPTION OF THE DRAWINGS

The present disclosure is described in conjunction with the appended figures:

FIG. 3 illustrates an embodiment of an offer according to an embodiment;

FIG. 4 illustrates an embodiment of an answer according to an embodiment;

FIGS. 7A and 7B illustrate windows displaying continuous presence information and how they shuffle in response to changes in active speakers, according to one embodiment;

FIGS. 9A and 9B illustrate windows displaying continuous presence information and shuffling of the windows in response to changes in active speakers, according to a third embodiment;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Embodiments described in the present application provide for a client to negotiate attributes that affect a user experience during a multimedia session, such as a video conference. The client is able to have some control of how audio/video data is output to a user, including without limitation, the video resolution of displayed information, shuffling of windows based on active speakers participating in a video conferences, and the layout of how the windows are displayed to a user. For example, the session may involve multi-stream continuous presence (CP) video sent as part of the video conference.

Figure 1:
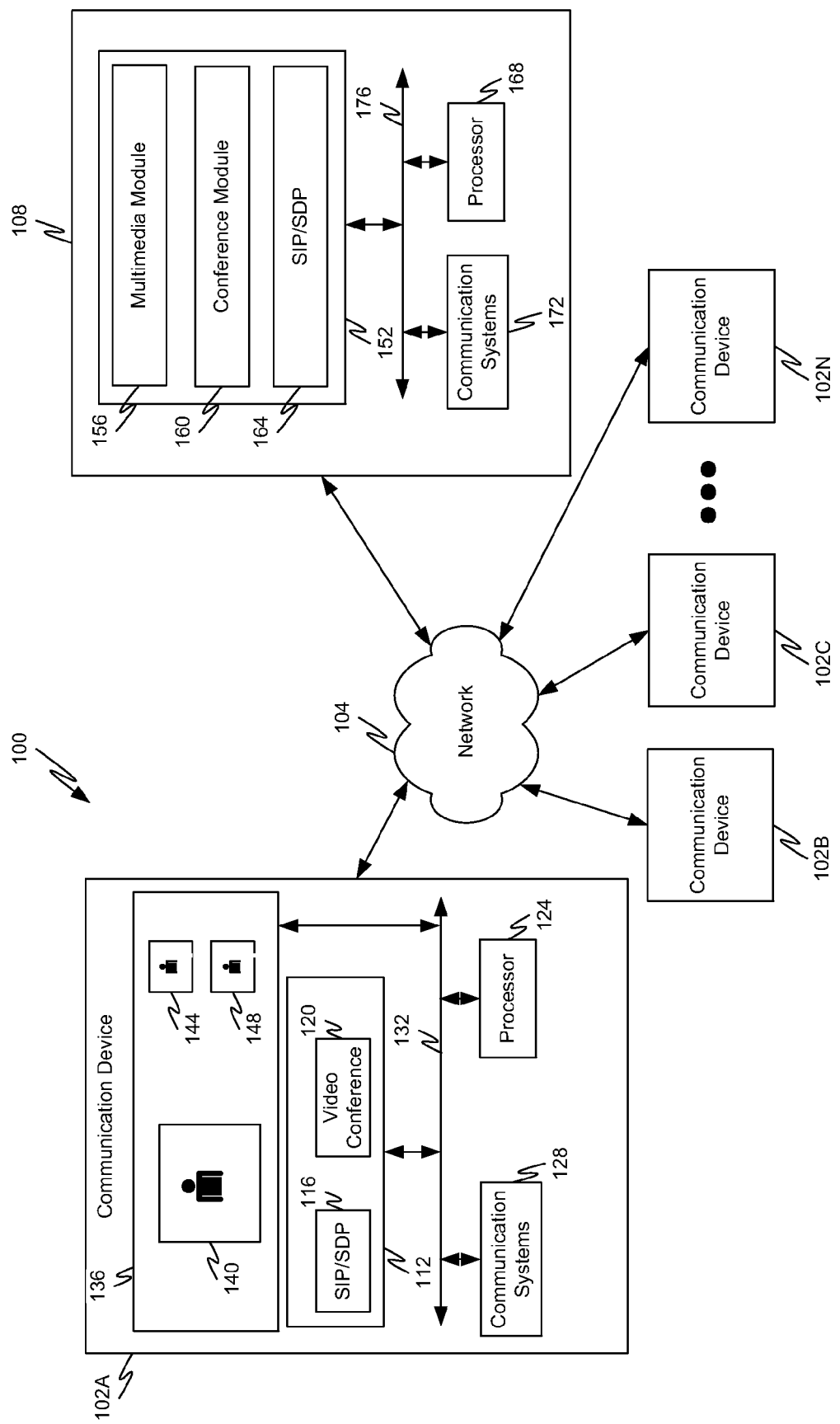
FIG. 1 is a block diagram of a system including a communication device according to an embodiment that can negotiate a multimedia session.

FIG. 1 illustrates a system 100 that includes communication devices 102A-102N, e.g., mobile phones, smart phones, mobile communications devices, telephones, soft phones, video displays, televisions, monitors, desktop computers, laptop computers, and the like. As illustrated in FIG. 1, communication devices 102A-102N are connected to a network 104 that allows the communication devices 102A-102N to communicate with each other. Also connected to the network 104 is a server 108, which in embodiments is a conference server with video conference and/or multimedia capabilities.

Communication device 102A includes, among other features, a memory 112, which may store files and executing application(s) and/or modules such as SIP/SDP module 116 and video conference module 120. As described in greater detail below, SIP/SDP module 116 and video conference module 120 are used to negotiate and engage in multimedia sessions between communication device 102A and other communication devices (e.g., 102B-102N) or servers (e.g., 108).

In addition to memory 112, communication device 102A also includes additional hardware such as a processor 124, and communication systems 128. The processor 124 is used to execute the code of applications and modules such as SIP/SDP module 116 and video conference module 120 and other applications stored in memory 108. A bus 132 provides a connection for transmitting signals among the memory 112, processor 124, and communication systems 128. Communication device 102A also includes a display 136, which is configured to display audio/visual data that is received by communication device 102A as part of a multimedia session. In the embodiment shown in FIG. 1, display 136 is displaying windows 140, 144, and 148 in which continuous presence information is displayed from participants of a video conference. In addition, communication device 102A may also include other input/output devices, including but not limited to display(s), e.g., speakers, lights, keypads, and microphones.

It is noted that although SIP/SDP module 116 and video conference module 120 are shown in FIG. 1 as stored in memory 112 of communication device 102A, in other embodiments, at least portions of the modules are stored on a server(s), i.e., they may utilize distributed code. As one example, if video conference module 120 is stored, at least in part, on a server, communication device 102A will communicate, using communications systems 128, with the server to access information from the video conference module 120, such as routines, subroutines, or other code, that may be stored on the server.

Server 108 includes among other features, memory 152, where files and modules are stored such as multimedia module 156, conference module 160, and SIP/SDP module 164. Server 108 also includes additional hardware such as a processor 168, and communication systems 172. The processor 124 is used to execute the code of applications and modules such as multimedia module 156, conference module 160, and SIP/SDP module 164 and other applications stored in memory 152. A bus 176 provides a connection for transmitting signals among the memory 152, processor 168, and communication systems 172. In addition, communication device 102A may also include other input/output devices, including but not limited to display(s), e.g., speakers, lights, keypads, and microphones.

In embodiments, communication device 102A engages in a number of different types of multimedia sessions with server 108. One specific type of multimedia session is a video conference in which a number of participants at different points utilize communication devices, e.g., 102B-102N to communicate in real-time using both audio and video data. Server 108 serves as a central point for collecting audio and video data from the communication devices. Server 108 then transmits the audio video data to the communication devices for output. Although the description below focuses on videoconferencing, embodiments are not necessarily limited to this application. In other embodiments, the media sessions may involve previously recorded (or near real time) audio/video data that is displayed to a user for entertainment, security, information, or other reasons. Therefore, although the description below provides the specific example of videoconferencing, embodiments are not limited thereto.

Figure 2:
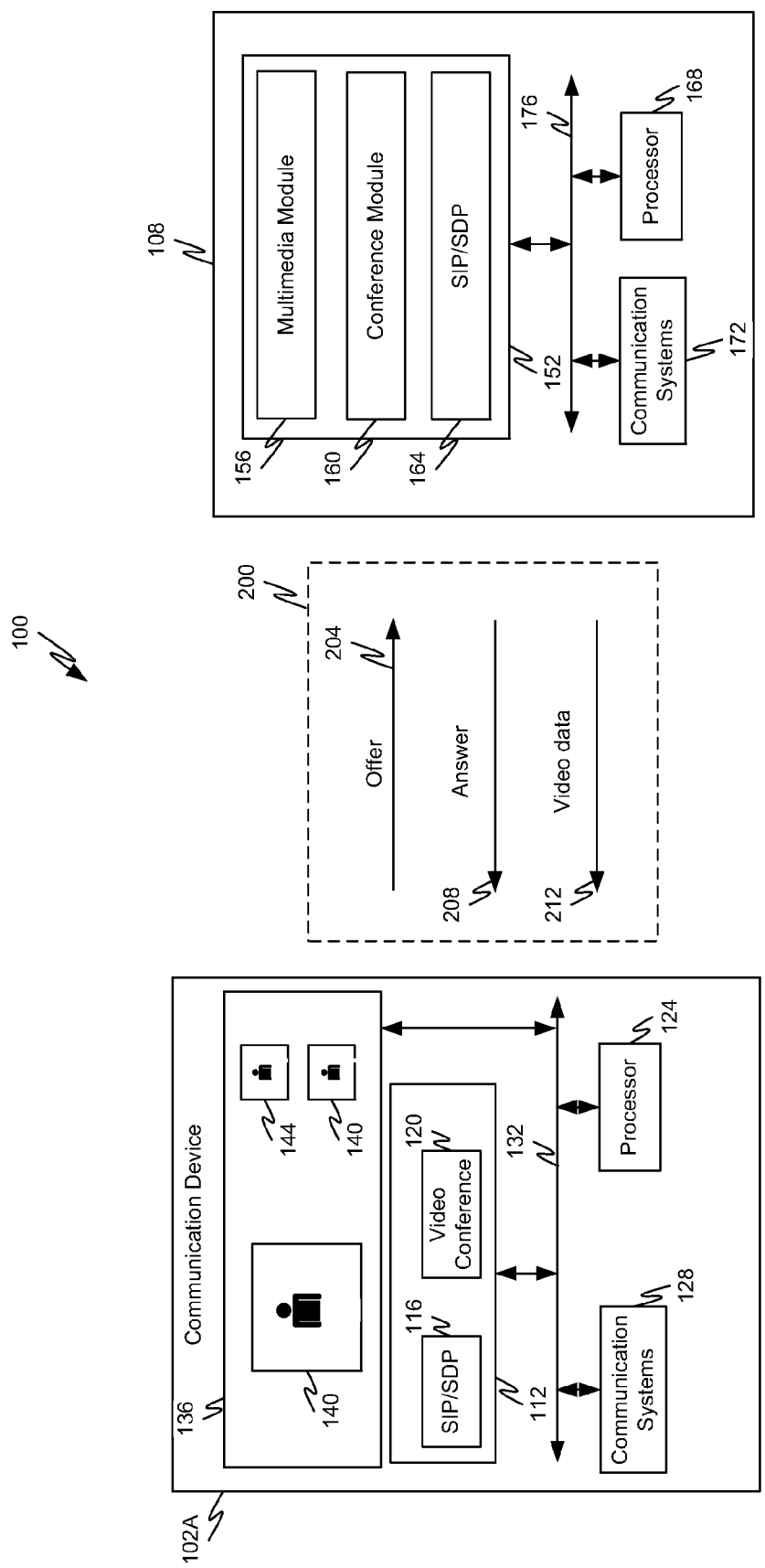
FIG. 2 is a block diagram showing a first communication device, according to an embodiment, exchanging messages with a second communication device to establish a multimedia session.

FIG. 2 illustrates one embodiment of communication device 102A negotiating and establishing a multimedia session, specifically a video conference session, with server 108, which is serving as the conference server for the video conference. In addition to communication device 102A at least three other communication devices, and participants, are also participating in the video conference. For purposes of simplicity, the plurality of messages 200 exchanged during the negotiation between communication device 102A and server 108 are shown as exchanged directly between communication device 102A and server 108. However, as can be appreciated, in actual operation, the plurality of messages 200 are transmitted through one or more networks which may be a LAN, a WAN, or other type of network. Additionally, it is noted that although specific messages are shown as being exchanged between communication device 102A and server 108, in other embodiments additional messages will be exchanged between device 102A and server 108. For example, messages for security protocols, transport protocols, and/or session initiation protocols will also be exchanged, in some embodiments. These additional messages may be exchanged before or after the plurality of messages 200 shown in FIG. 2.

As illustrated in FIG. 2, communication device 102A initially sends an offer 204 to server 108. The offer 204 may be formatted according to any appropriate protocol used to negotiate multimedia sessions. In one specific embodiment, the offer is formatted according to a Session Description Protocol (SDP), which provides a format for describing streaming media initialization parameters. Embodiments are not limited to SDP and the offer 204 may be in any suitable format. In addition, other protocols such as security protocols, transport protocols, and/or multimedia protocols may be used in generating and transmitting offer 204. In one embodiment, Security Initiation Protocol (SIP) is used as a transport protocol when transmitting offer 204. In this embodiment, one or more of SIP/SDP module 116 and video conference module 120, are used to generate offer 204.

In response to offer 204, server 108 transmits an answer 208, followed by video data 212, which is multi-stream continuous presence (CP) video (e.g., multi Scalable Video Coding (SVC) or Advanced Video Coding (AVC) video streams) from participants in the videoconference. The communication device 102A decodes the video data 212 and renders the CP video for display on various windows on communication device 102A. In embodiments where SDP is used in formatting the offer 204, the multi-stream video streams are negotiated using n video (e.g., "m lines") in an SDP offer, where n>1. For example, n=4 indicates that the CP video will contain 4 participants/windows. A single video, referred to in an SDP request as an m line with an n=1, means no CP and typically display the most recent active speaker.

In conventional negotiations using SDP, only the codec used, bit rate (AVC and SVC), number of layers used (SVC) and direction (e.g., received only (recvonly), send and receive (sendrcv), send only (sendonly)) are negotiated. However, these do not address the user experience aspects of the CP layout (e.g. whether windows are displayed in a 2×2, 1+3 format), the grouping of CP windows, handling of bandwidth reduction/optimization and window shuffling algorithms. Therefore according to embodiments, offer 204 includes additional attributes that allow user experience aspects to be negotiated. FIG. 3 illustrates an embodiment of offer 204 that is formatted according to SDP, consistent with one embodiment. FIG. 4 illustrates an embodiment of an answer 208 that is formatted according to SDP, consistent with one embodiment.

As shown in FIG. 3, offer 204 includes a number of different attributes that may be referred to as window content specification. At line 216, there are a string of attributes that, consistent with embodiments, address user experience aspects of the video that will be transmitted as part of the video conference being negotiated by communication device 102A. The attributes include a first window identifier 220, a first group identifier 224, a first bandwidth limit identifier 228, and a first rank identifier 232. Each of these attributes provides information for how the client will output at least a portion of the video, transmitted as part of the video conference, in a first window. Line 236 also includes attributes including, a second window identifier 240, a second group identifier 244, a second bandwidth limit identifier 248, and a second rank identifier 252. These attributes provide information for how the client will output at least a second portion of the video in a second window. As noted above, these parameters (window identifiers, bandwidth limit identifiers, group identifiers, and rank identifiers) can be included in an offer and may be referred to as window content specification.

In some embodiments, the attributes are selected by a user or an administrator. The attributes can be selected to tailor the user experience to the multimedia session, or according to a particular preference. In other embodiments, there may be default values that are set if no input for the attributes are received. For example, the default values may be group identifier=1, bandwidth reduction limit identifier=100, vasrank=1. These values are described in further detail below.

Additionally, line 218 includes an indication as to whether or not the attributes that precede line 218 are applicable to video content that is sent and/or received. As indicated in FIG. 3, line 218 indicates that the attributes noted above it, including in line 216, are intended for bidirectional video, i.e., video that is both sent and received by communication device 102A. Line 238 indicates that the attributes noted above it are only for video that is received. The client can therefore be flexible when negotiating the session with server 108, such as by indicating that it will send video in high resolution but only receive video in lower resolution or vice versa.

FIG. 4 illustrates an embodiment of an answer 208 that is formatted according to SDP. Answer 208 acknowledges the attributes that were sent in the offer 204. In some embodiments, answer 208 may provide counter offers or may indicate that it cannot accommodate the attributes that have been requested by communication device 102A. In these embodiments, communication device 102A would then send another offer with different attributes in an attempt to negotiate attributes that are acceptable to server 108.

Referring again to FIG. 3, window identifiers 220 and 240 are used to identify the windows on the client that will be used to display the video streams. Although only two window identifiers are shown in the offer 204, in other embodiments, offer 204 may include more than two window identifiers. Each identifier is associated with a single window, which is used to display video from one video stream. In embodiments, each video stream is from one of the participants in the conference. As can be appreciated, any type of identifier may be used as window identifiers 220 and 240, including any alphanumeric value. In one embodiment, group identifiers are one or two digit numbers that range from 1-99, with the lower number being of higher priority.

Group identifiers 224 and 244 are each associated with one or more windows. The group identifiers 224 and 244 are used to group windows together. Windows are grouped together for any number of reasons, for example to identify groups of windows with similar properties, i.e., windows with the same size and resolution, to change the properties of more than one window at a time, or for any other purpose. In one embodiment, group identifiers 224 and 244 are used in combination with bandwidth limit identifiers 228 and 248 as described in greater detail below. Although group identifiers 224 and 244 are shown in offer 204 as numeric values, in other embodiments, they may be any identifier including an alphanumeric value.

Figure 5:
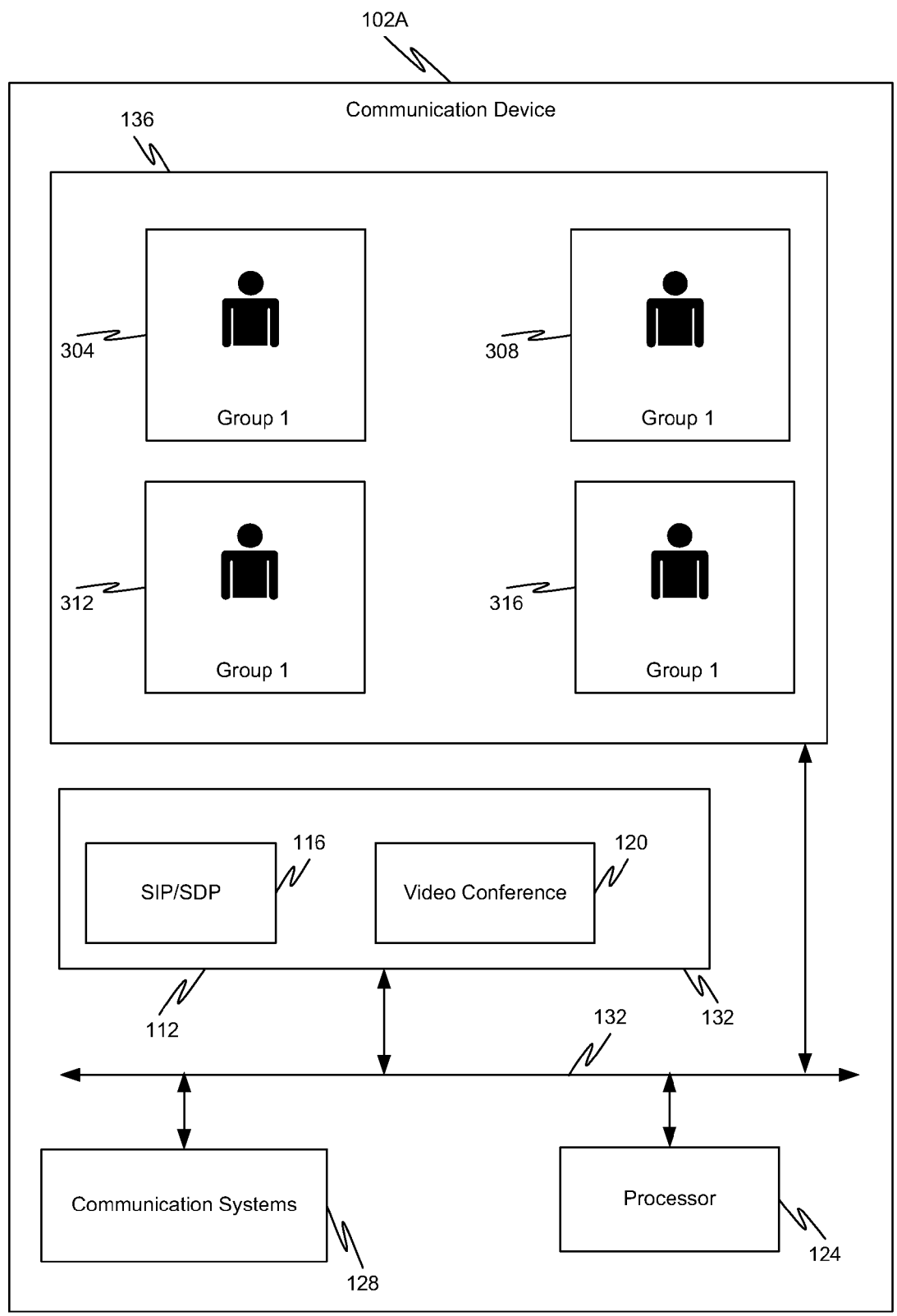
FIG. 5 illustrates a layout with one group of windows for displaying continuous presence information to a user, according to one embodiment.
Figure 6:
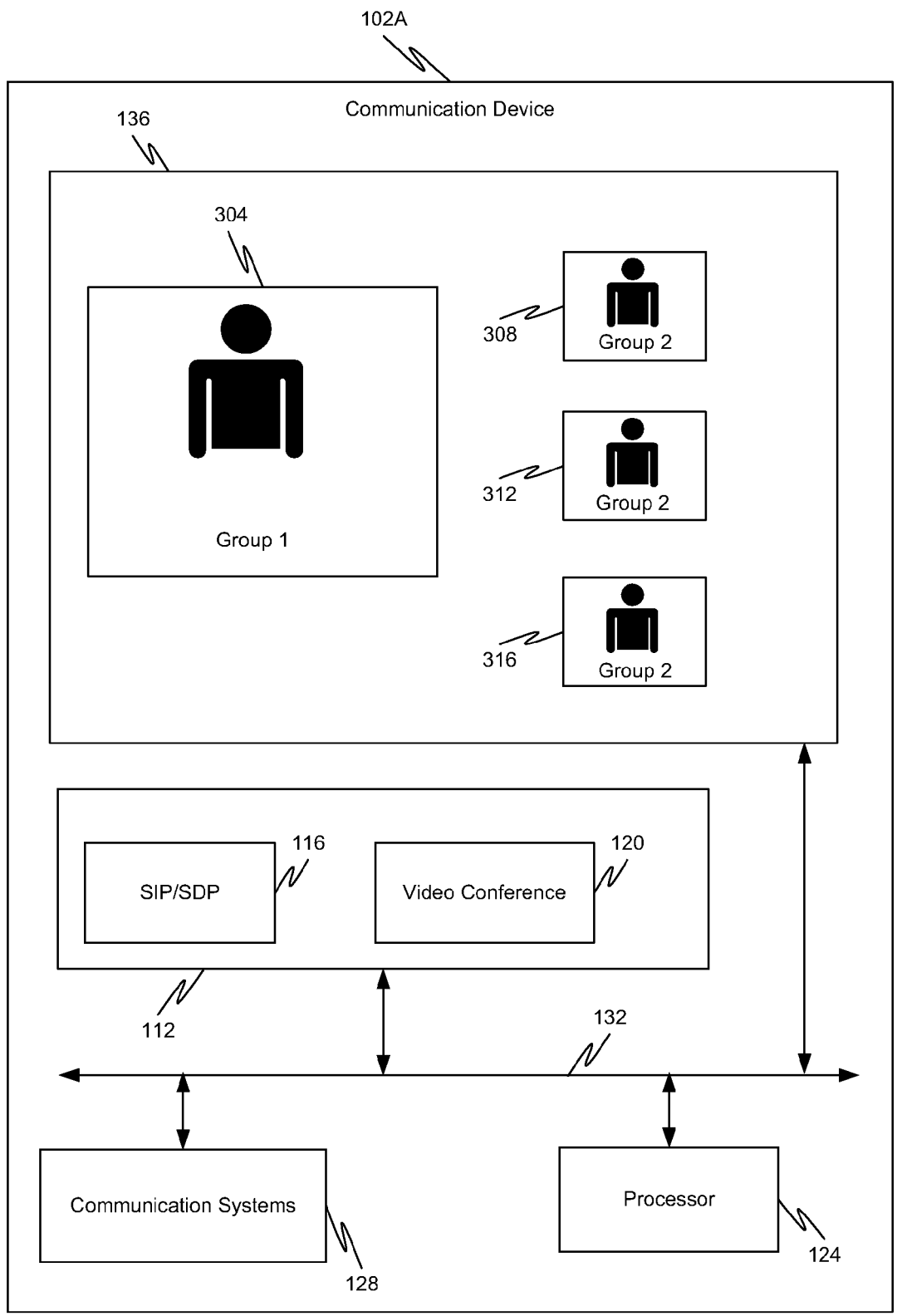
FIG. 6 illustrates a second layout with two groups of windows for displaying continuous presence information to a user, according to one embodiment.

In embodiments, windows are grouped according to their layout as displayed on communication device 102A. FIGS. 5 and 6 illustrate four windows (304, 308, 312, and 316) that are grouped differently according to their displayed layouts on communication device 102A. FIG. 5 illustrates that the four windows are each grouped within a single group, namely group 1. As can be seen, the four windows (304, 308, 312, and 316) are the same size when displayed on display 136.

FIG. 6 illustrates a second embodiment in which the four windows (304, 308, 312, and 316) are grouped within two different groups. In FIG. 6, group 1 includes a single window 304 and group 2 includes three windows 308, 312, and 316. The layout shown in FIG. 6 can be used to highlight the participant that is currently actively speaking by displaying the video of the active speaker on window 304. The remaining windows 308, 312, and 316 are be used to display video from other participants in the video conference.

It is noted that FIGS. 5 and 6 are provided to illustrate an example of window groupings consistent with embodiments. In other embodiments, however, the groupings and specific layouts of windows may vary. For example, the windows 308, 312, and 316 in group 2 may be displayed in a different layout, such as above window 304, below window 304, or on the left side of window 304. In another embodiment, each window from group 2 can be displayed near a different corner of window 304. These are merely some examples, and other groupings and/or layouts are possible. As can be appreciated, moderator and participants in the video conference can use different layouts and each can change their layout mid call, each can also have/change to a single Active Speaker window or just audio. This flexibility is not currently available.

Referring again to FIG. 3, bandwidth limit identifiers 228 and 248 are used to set a limit on the amount a video stream can be reduced in resolution. As can be appreciated, conference servers are under bandwidth constraints. Therefore, they can at any time reduce their bandwidth consumption by reducing the resolution of video it is streaming. Typically, the server reduces the resolution of streaming video based on its own preprogrammed algorithms without necessarily considering the user experience on the client. Bandwidth limit identifiers 228 and 248 allow the client in its negotiation of the multimedia session to limit the amount that particular video streams can be reduced in resolution. This allows the client to control the user experience. For example, if the client determines that video being displayed in one particular window will suffer too greatly from quality if reduced to below a predetermined resolution; it will provide a bandwidth limit identifier that does not allow for the resolution to fall below the predetermined resolution. On the other hand, there may be some video displayed in another window whose quality can be reduced by more than the predetermined resolution and still provide a suitable user experience. The client can therefore provide a lower bandwidth resolution limit.

Bandwidth limit identifiers 228 and 248 can be any suitable identifier that is understood by the server as a bandwidth limit. In the offer 204 shown in FIG. 3 bandwidth limit identifier 228 indicates a percentage of an original resolution, namely 25% of an original resolution. In this embodiment, the server understands that the client has requested that the video stream associated with window 1 should not be reduced by more than 25% of the original resolution. The client in this embodiment has determined that reducing the resolution of window 1 by more than 25% affects the quality of the user experience too greatly and therefore 25% has been used as the bandwidth limit identifier 228. On the other hand, bandwidth limit identifier 248 provides a limit of 50% of an original resolution. Thus, the video stream associated with window 2 can be reduced by as much as 50% of its original resolution. The client is therefore determined that the video being played in window 2 can be reduced up to as much as 50% of its original resolution and still provide an adequate user experience.

As one example, the display layout may be as shown as in FIG. 6, with window 1 corresponding to window 304 and window 2 corresponding to one of windows 308, 312, or 316. Because window 2 is a smaller window, reducing the resolution does not affect the user experience as much as reducing the resolution of content displayed in window 1. Thus, reducing the resolution up to 50% of the original resolution may be acceptable. In contrast window 1, which is larger, will have a grainy appearance if the resolution is reduced too much.

The bandwidth limit identifiers 228 and 248 are defined as a percentage of a video's original resolution. Although in other embodiments, bandwidth limit identifiers can be defined differently. For example, offer 204 may refer to a specific resolution. In other embodiments, the bandwidth limit identifiers may be an alphanumeric value that is understood by the server to represent resolution limits. As can be appreciated, these are merely some examples and the bandwidth limit identifiers are not necessarily limited thereto.

As indicated above, group identifiers 224 and 244 can be used in combination with the bandwidth limit identifiers 228 and 248 to control the user experience at communication device 102A. In some embodiments, the group identifiers 224 and 244 have a predetermined priority. For example, the group identified by group identifier 224 ("group 1") may have a higher priority than the group identified by group identifier 228 ("group 2"). When used in combination with the bandwidth limit identifiers 228 and 248, the server 108 understands that if there is a need to reduce resolution of video being streamed from server 108 to communication device 102A, because of bandwidth constraints, the video content associated with windows in the group associated with group identifier 228 (namely "group 2") should be reduced first, up to the resolution limit identified by bandwidth limit identifier 228. After the reduction in resolution of the video content associated with the windows in group 2, if necessary, the video content associated with the windows in group 1 can then be reduced in resolution, up to the resolution indicated by bandwidth limit identifier 248. In combination, the group identifiers and the bandwidth identifiers are used to control the user experience at communication device 102A, which is not currently possible with the available versions of SDP.

Referring again to FIG. 3, rank identifiers 232 and 252 in offer 204 are provided to allow for windows to change based on participants speaking activity. These identifiers may be referred to as voice active rank identifiers. The rank identifiers indicate the desired assignment of active speakers to a window. The server will assign the window based on the active speaker history and the rank identifier provided by the client. The identifier with the highest rank, e.g., identifier 232 ("Rank 1") gets the most recently active speaker. In other words, the participant that is currently speaking, or most recently spoke, is displayed in the window with the highest rank, which in offer 204 is window 1. The identifier with the next highest rank, e.g., identifier 252 ("Rank 2") gets the second most recently active speaker, and so on.

FIGS. 7A-10B illustrate various embodiments of using different rank identifiers for four windows (304, 308, 312, and 316), and their behavior in response to their rank identifiers and speaking activity. These are provided for illustrative purposes only and embodiments are not necessarily limited thereto. For simplicity, only display 136 of communication device 102A-is shown in FIGS. 7A-10B.

In FIG. 7A, communication device 102A has sent an offer, such as offer 204, indicating four windows (304, 308, 312, and 316), each of which displays different continuous presence information for participants in the videoconference. Window 304 was associated with a rank identifier "rank 1," window 308 was associated with a rank identifier "rank 2," window 312 was associated with a rank identifier "rank 3," and window 316 was associated with a rank identifier "rank 4." Consistent with the description above, in this embodiment the window with rank 1 displays the most recently active speaker, the window would rank 2 displays the second most recently active speaker, the window with rank 3 displays the third most recent speaker, and the window with rank 4 displays the fourth most recent speaker. As shown in FIG. 7A, participant 1 is the most recently active speaker, participant 2 is the next most recent speaker, participant 3 is the third most recent speaker, and participant 4 is the fourth most recent speaker.

When participant 5 begins to speak, windows 304, 308, 312, and 316 are shuffled in response, consistent with their rank. FIG. 7B illustrates, windows (304, 308, 312, and 316), after they have been shuffled in response to participant 5 speaking. Participant 5 is shown in window 304 because she is the most recent speaker and window 304 has the rank identifier rank 1. Windows 308, 312, and 316 are shuffled so that participant 1 is shown in window 308, participant 2 is shown in window 312, and participant 3 is shown in window 316.

Figure 8B:
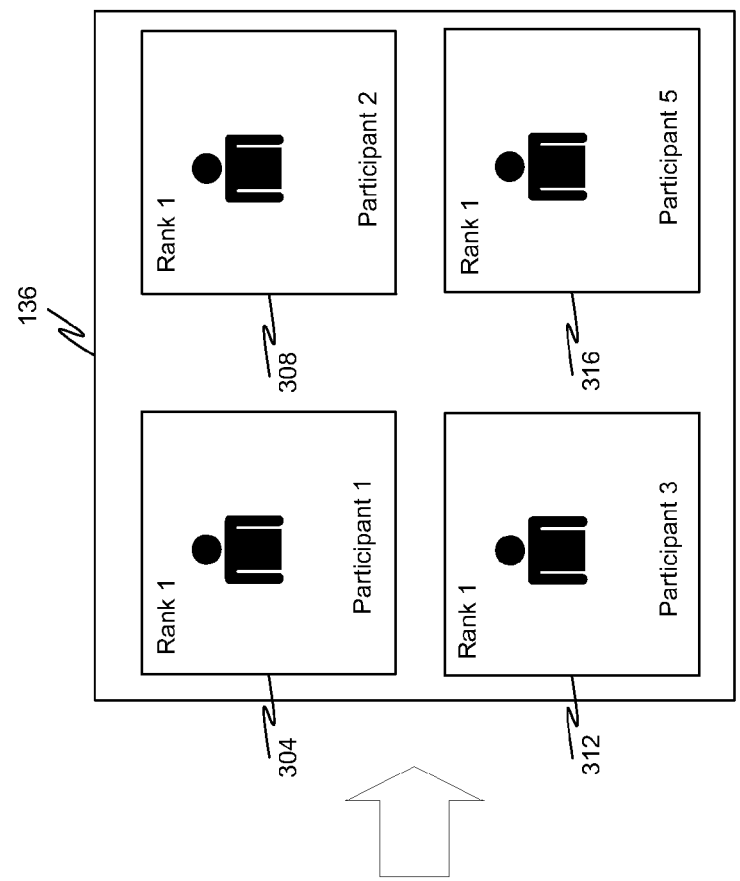
FIGS. 8A and 8B illustrate windows displaying continuous presence information and shuffling of the windows in response to changes in active speakers, according to a second embodiment.
Figure 8A:
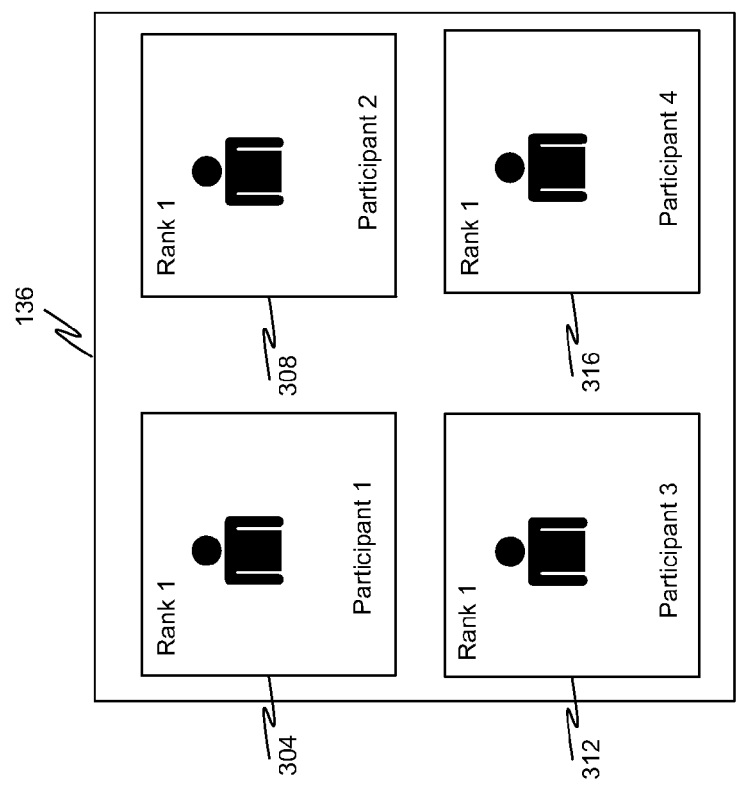

FIGS. 8A and 8B illustrate windows 304, 308, 312, and 316 with the same rank identifier, namely rank 1. This illustrates the embodiment where multiple windows have the same rank, which results in minimal shuffling. As shown in FIG. 8A, participant 1 is displayed in window 304, participant 2 is displayed in window 308, participant 3 is displayed in window 312, and participant 4 is displayed in window 316. When participant 5 begins to speak, instead of replacing participant 1 in window 304, participant 5 replaces participant 4 and is displayed within window 316, as shown in FIG. 8B. None of the other windows are changed. That is, shuffling is minimized so that only one window is changed to display the most recent speaker. In this embodiment, the server 108 decides which of the windows is changed so as to minimize the shuffling of windows 304, 308, 312, and 316. In other embodiments, the server 108 may decide to replace any of the other participants in the other windows, as long as the shuffling is minimized. This feature allows the communication device 102A to control the user experience by assigning the same rank identifier for all of the windows, which results in the server having to minimize shuffling of windows when speakers switch in and out.

Some embodiments provide for selecting rank identifiers so that the behavior is a combination of having the most recently active speaker highlighted, but minimizing the shuffling of the other participants. FIGS. 9A and 9B illustrate windows 304, 308, 312, and 316 where window 304 has a rank identifier of rank 1, and windows 308, 312, and 316 have the same rank identifier, namely rank 2. Window 304 will display the most recent active speaker. The other windows 308, 312, and 316, will display the next 3 most recent active speakers. Because windows 308, 312, and 316, all have the same rank identifier, the order for these windows will be determined by the server 108 to minimize shuffling. As shown in FIG. 9B, when participant 5 begins to speak, window 304 is changed to display participant 5. To minimize shuffling, server 108 has changed window 316 to display participant 1. This minimizes shuffling among windows 308, 312, and 316, because 308 and 312 remain unchanged.

Figure 10B:
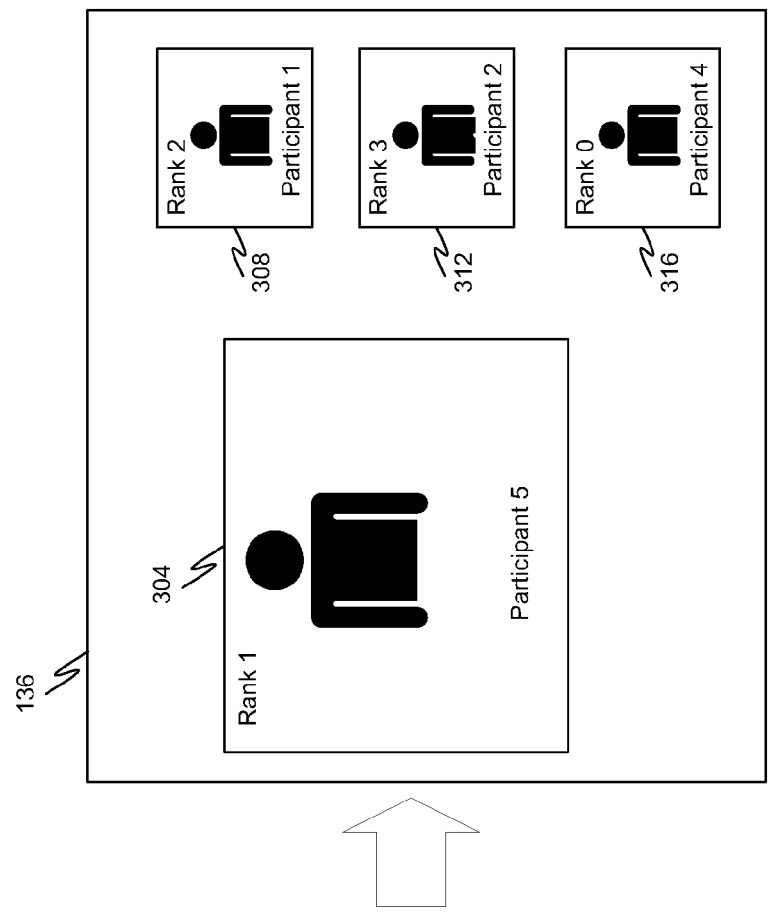
FIGS. 10A and 10B illustrate windows displaying continuous presence information and shuffling of the windows in response to changes in active speakers, according to a fourth embodiment.
Figure 10A:
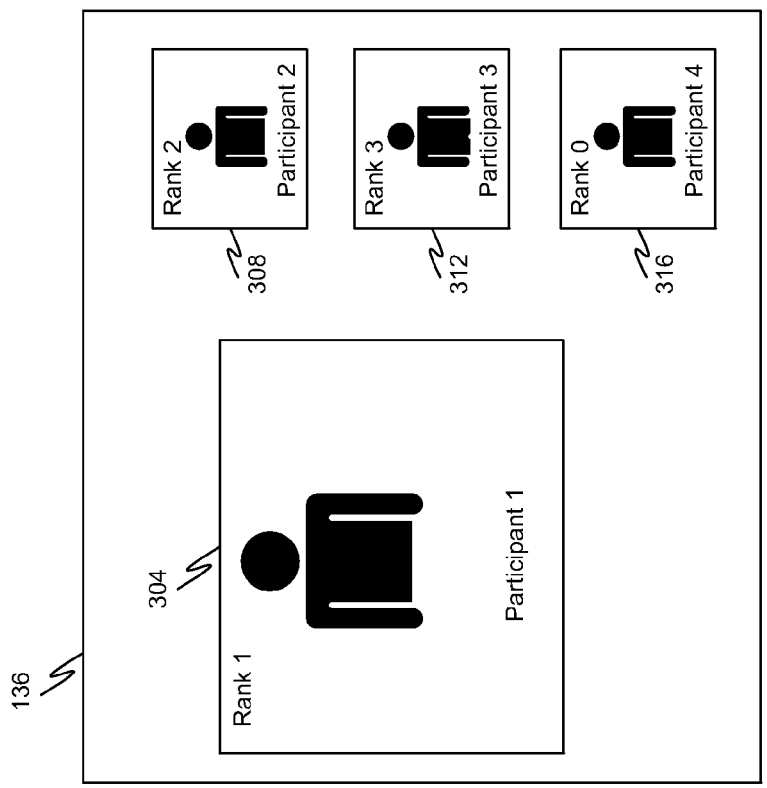

In some embodiments, rank identifiers can be used to pin a particular window. By "pinning" it is meant that the participant displayed in a window is never changed, even if there is speaking activity by other participants. FIGS. 10A and 10B illustrate windows 304, 308, 312, and 316 where window 304 has a rank identifier of rank 1, windows 308 has a rank identifier of rank 2, window 312 has a rank identifier of rank 3, and window 316 has a rank identifier of rank 0. In this embodiment, rank 0 indicates that a window is pinned; therefore, participant 4 (shown in window 316) is always displayed in window 316. When participant 5 begins to speak, as shown in FIG. 10B participant 5 replaces participant 1 in window 304. Participant 1 is then displayed in window 308, and participant 2 is displayed in window 312. Because window 316 is associated with rank identifier rank 0, it continues to display participant 4 even after participant 5 begins to speak. This embodiment may be useful in a number of situations. For example, in videoconferences where there will primarily be one speaker, the rank identifier can be selected so that the primary speaker is always displayed in a window even when not speaking. This embodiment is also useful in situations where there is an important participant in the videoconference, so even if not speaking the participant should be displayed in one of the windows.

In some embodiments, if a rank is not specified, in an offer, a default rank identifier is assigned. For example, a rank of 1 may be the default value for all windows in order to minimize shuffling. As can be appreciated, in other embodiments, the default value may be any value that is predetermined by an algorithm in the communication device 102A, selected by a user of communication device 102A, or preprogrammed by an administrator.

It is noted that although specific examples of offers and attributes in the offers are described above, any combination of attributes can be used to describe layouts for displaying video data, such as continuous presence information for a video conference. Additional examples of combination of attributes that describe various layouts (some of which are shown in FIGS. 5-10B) are provided below for illustrative purposes.

EXAMPLE 1

1×4/2×2 Layout a=conteni: window1,1,100, 1 (this window gets the most recent speaker)
a=content: window2.1.100, 2 (2nd or 3rd most recent)
a=content: window3,1,100, 2 (2nd or 3rd most recent)
a=content: window4,1,100, 0 (pinned video/not switched based on speaker activity)

EXAMPLE 2

1+3 Layout a=content: window1,1,100, 1
a=content: window2,2,100, 2
a=content: window3,2,100, 2
a=content: window4,2,100, 2

In Example 2, window1 will display the most recent active speaker. The other 3 windows will get the next 3 most recent active speakers, minimum shuffling will be applied to windows 2,3,4.

EXAMPLE 3

1×4/2×2 Layout a=content: window1,1,100, 1
a=content: window2,1,100, 1
a=content: window3,1,100, 1
a=content: window4,1,100, 1

In Example 3, all four windows will get switched with active speaker streams, minimum shuffling will be applied to all.

Figure 11:
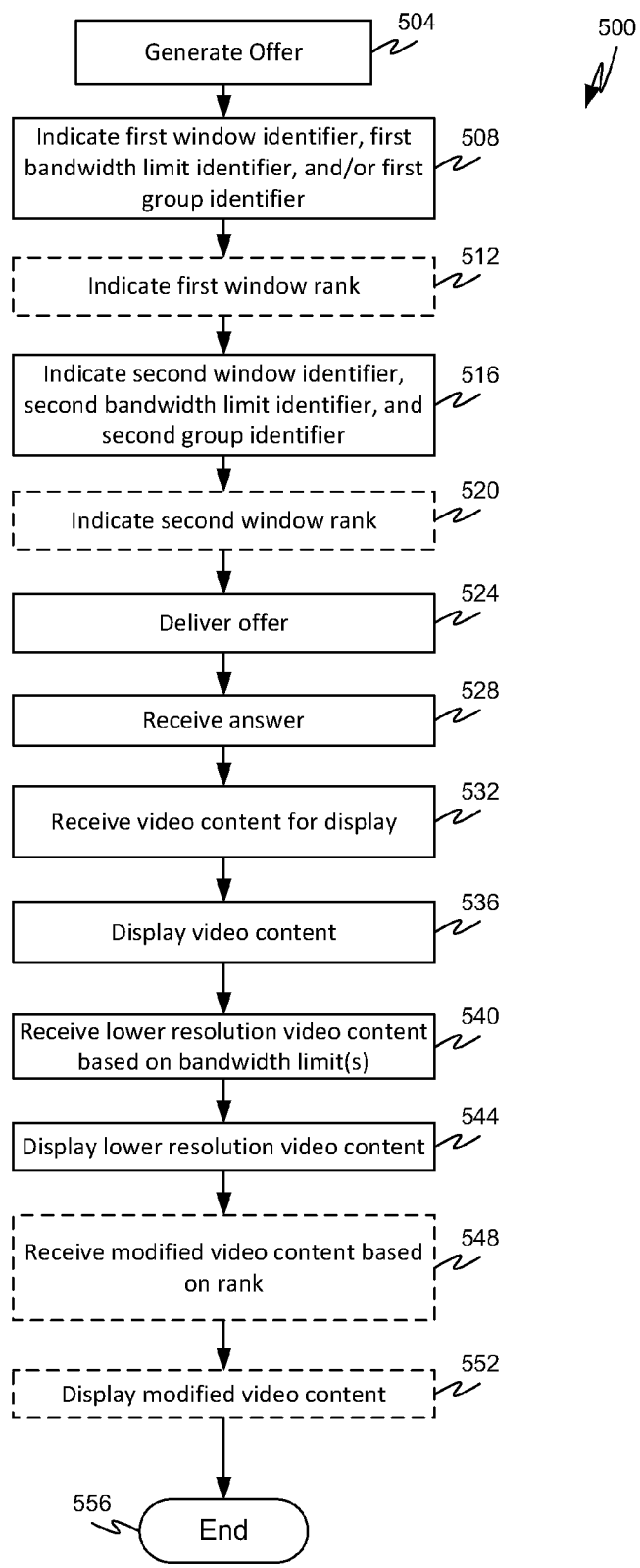
FIG. 11 is a flow diagram of an embodiment of a process for negotiating a multimedia session and receiving audio and/or visual data for the multimedia session.

Referring now to FIG. 11, a flow diagram 500, for negotiating a multimedia session, e.g., a videoconference. Flow 500 is in embodiments performed by a computing device such as communication device 102A (FIGS. 1-2) or other client computing device. More specifically, one or more hardware or software components may be involved in performing flow 500. For example, portions of flow 500 may be performed by a SIP/SDP module 116 and/or video conference 120.

Flow 500 begins with step 504 where an offer for negotiating a multimedia session is generated. The offer is in embodiments formatted according to SDP, such as offer 204 described above. The offer may be formatted according to different protocols in other embodiments. Flow passes from step 504 to step 508 where an indication of a number of different attributes including a first window identifier, a first bandwidth limit identifier, and/or a first group identifier, are indicated in the offer. At optional step 512, a rank identifier may also be included in the offer generated at step 504. As indicated above, the rank identifier may be used in controlling the behavior of displayed windows in response to speaking activity.

At step 516, a second group of attributes including a second window identifier, a second bandwidth limit identifier, and/or a second group identifier, are indicated in the offer. At optional step 520, a second rank identifier may also be included in the offer generated at step 504. As can be appreciated, flow 500 is limited to an offer that identifies two windows and attributes associated with the two windows. In some embodiments, the offer may include attributes of more than two windows, in which case, flow 500 will include additional steps for indicating attributes of the additional windows.

After the indications of window attributes have been made in the offer, for all of the windows, flow 500 passes to step 524, where the offer is delivered to a network for transmission. In embodiments, step 524 includes in embodiments delivering the offer to a multimedia server and/or a videoconference server. Step 524 may entail the use of a number of different protocols, such as transport protocols, security protocols, and other multimedia protocols. Step 524 includes the necessary sub steps (e.g., generating headers, packets, etc.) for delivering the offer for transmission to the server. And answers that received at step 528.

Flow passes from step 528 to step 532 where video content is received for display. The video content is then displayed at step 536. Step 536 may involve a number of sub steps including decoding the video content received at step 532 before it is displayed. Display of the video content at step 532 involves displaying the video content on a number of different windows. The windows may be laid out in any desired manner, some examples shown in FIGS. 5 and 6, and described above.

At step 540, lower resolution video content is received and at step 544 the lower resolution video content is displayed. Step 540 may be a result of the server having reached bandwidth constraints. In order for the server to comply with the bandwidth constraints, it must reduce the resolution of the video content. As indicated above however, the offer delivered at step 524 included attributes such as group identifiers and bandwidth limit identifiers. The reduced resolution content received at step 540 and displayed at step 544 will therefore be consistent with the bandwidth limit identifiers sent in the offer. As one example, the video content for display in windows identified by a group identifier of a lower rank will be reduced in resolution first, up to any bandwidth limit identifier associated with the group. Video content for display in windows identified by a second group identifier, of a higher rank, will then be reduced up to any bandwidth limit identifier associated with the second group.

As noted above, optional rank identifiers may be indicated in the offer at optional steps 512 and 520. The rank identifiers are used to control the display of video content in windows as a result of speaking activity. In those embodiments, flow 500 will include optional step 548, where modified data is received based on the rank and the speaking activity during the multimedia session. Step 548 is then followed by step 552 where the modified video content is displayed. Flow 500 then ends at 556.

FIG. 5 illustrates a flow diagram 600 for negotiating a multimedia session, such as a videoconference. Flow 600 is in embodiments performed by a computing device such as server 108 (FIGS. 1-3), or other multimedia and/or conference server. More specifically, one or more hardware or software components may be involved in performing flow 600. For example, portions of flow 500 may be performed by multimedia module 156, videoconference module 160, and/or SIP/SDP module 164 described above.

Flow 600 begins with step 604 where an offer for a multimedia session is received. The offer includes indications of attributes including one or more window identifiers, one or more bandwidth limit identifiers, one or more group number identifiers, and/or one or more ranks. In embodiments, the offer is received from a client device, such as communication device 102A. Flow passes from step 604 to step 608 where in response to the offer received at step 604, an answer is transmitted. In embodiments, the answer may be formatted according to SDP. The answer may acknowledge the attributes of the offer received at step 604, indicating that the attributes are acceptable. In other embodiments, the answer may provide a counter offer that includes different attributes than those included in the offer received at step 604. In these embodiments, the offer and answer are one of several messages that are sent and transmitted during the negotiation of the multimedia session.

Flow 600 passes from step 608 to step 612 where video content is transmitted. It is noted that in order for the video content to be transmitted, there may be additional steps that are performed in parallel with and/or prior to step 612. For example, video content can be received from various sources, i.e. client devices that are being utilized by participants of a videoconference. The video content can include combined video/audio streams that are then encoded before they are transmitted at step 612.

Following step 612, resolution of the video content is reduced at step 616. Step 616 may be performed as a result of bandwidth constraints. For example, a server performing flow 600 may be utilizing bandwidth to perform other operations. As a result, the server must do something to reduce its bandwidth consumption. By reducing the resolution of video content at step 616, the server can comply with the bandwidth constraints. Their reduction of resolution is performed in accordance with the attributes received in the offer received at step 604. For example, if there are priorities set with respect to group identifiers, then the video content for display on those windows with a lower priority group is first reduced in resolution. Additionally, if there is a bandwidth limit identifier that limits the amount by which the resolution can be reduced, then the server will comply with those bandwidth limit identifiers. At step 620, the reduced resolution video content is transmitted.

In those embodiments in which the offer includes a rank identifier, flow 600 includes additional optional steps 624 and 628. As described above, the rank identifiers are used in shuffling windows on the communication device that is displaying the video content transmitted at steps 612 and 620, in response to speaker activity. Therefore, at step 624, a server can modify the video content in accordance with the ranks received any offer, and the speaking activity. The modified video content is then transmitted at step 628. Flow then ends at 632.

Figure 12:
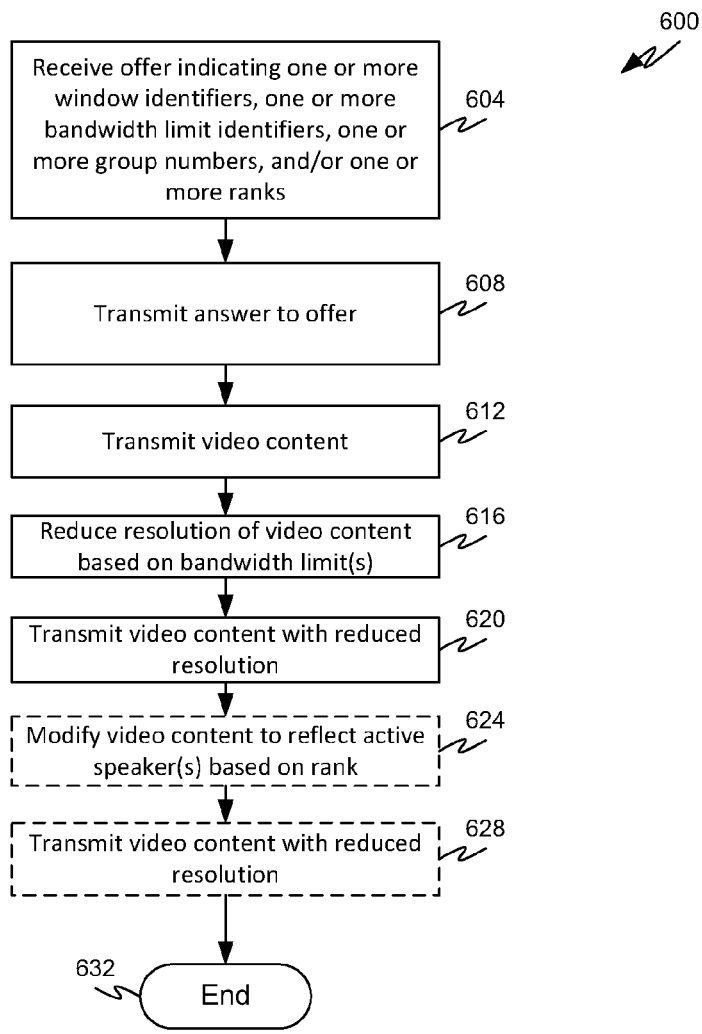
FIG. 12 is a flow diagram of an embodiment of a process for negotiating a multimedia session and sending audio and/or visual data for the multimedia session.

It is noted that although flows 500 and 600 illustrate steps in an order, other embodiments are not necessarily limited thereto. The steps shown in FIGS. 11 and 12 may be performed in any order or in parallel. Additionally, there may be other steps performed that are not shown in FIGS. 11 and 12 or described above. Also, although the flows 500 and 600 are described above as being performed in some embodiments by particular hardware and/or software components, other embodiments are not necessarily limited to the description above. As can be appreciated, steps 500 and 600 can be performed by other hardware or software not described above or shown in FIGS. 11 and 12.

Figure 13:
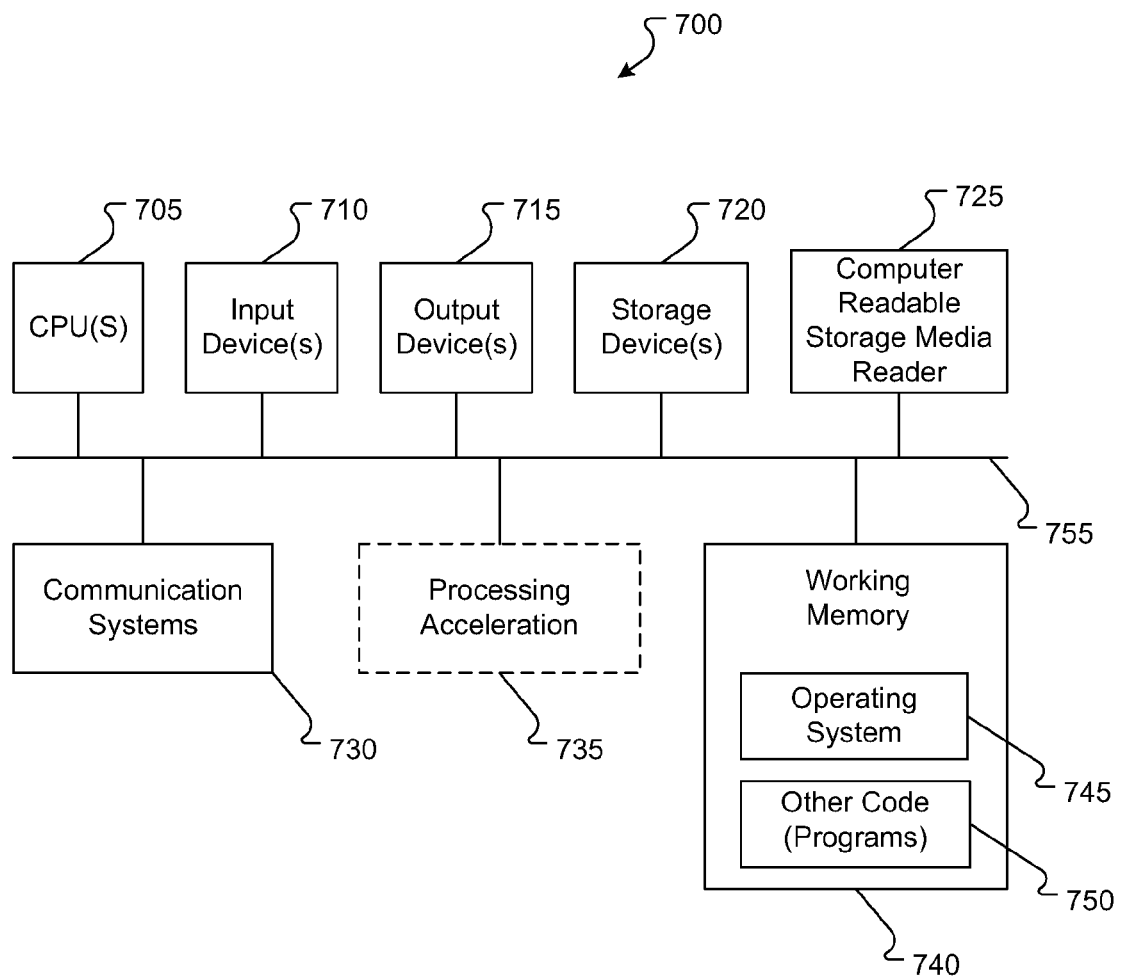
FIG. 13 is a block diagram of an embodiment of a computer or computing system environment operable to execute as the one or more devices described herein.

FIG. 13 illustrates one embodiment of a computer system 700 upon which servers or other systems described herein may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage device 720. By way of example, storage device(s) 720 may be disk drives, optical storage devices, solid-state storage device such as a random access memory ("RAM") and/or a read-only memory ("ROM"), which can be programmable, flash-updateable and/or the like.

The computer system 700 may additionally include a computer-readable media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like.

The computer-readable media reader 725 can further be connected to a computer-readable medium, together (and, optionally, in combination with storage device(s) 720) comprehensively representing remote, local, fixed, and/or removable storage devices plus a computer-readable medium for temporarily and/or more permanently containing computer-readable information. The communications system 730 may permit data to be exchanged with the network 520 and/or any other computer described above with respect to the system 700.

The computer system 700 may also comprise software elements, shown as being currently located within a working memory 740, including an operating system 745 and/or other code 750, such as application code implementing the servers or devices described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the application code or code segments to perform the necessary tasks may be stored in a machine readable medium such as storage medium. A processor(s) may perform the necessary tasks. A code segment may represent a procedure, a function, a subprogram, an application, a routine, a subroutine, a module, a software package, a class, or any combination of instructions, data structures, or application statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method, comprising:
generating, by at least one processor, an offer for a multimedia communication session, the offer comprising window content specification for at least one window, wherein the window content specification comprises a higher priority group identifier that is assigned a higher priority than a lower priority group identifier, the higher priority indicating that resolution reductions should be applied to content for display in windows of the lower priority group before resolution reductions are applied to content for display in windows of the higher priority group, wherein the window content specification comprises a first bandwidth limit identifier indicating a limit for reducing the resolution of video content for display in windows of the lower priority group, wherein the first bandwidth limit identifier indicates a percentage of an original resolution for the lower priority group, wherein the window content specification comprises a second bandwidth limit identifier indicating a limit for reducing the resolution of video content for display in windows of the higher priority group, and wherein the second bandwidth limit identifier indicates a percentage of an original resolution for the higher priority group;
delivering, by the at least one processor, the offer to a network for transmission by the at least one processor;
receiving an answer to the offer; and
receiving, by the at least one processor, video content for displaying the at least one window.

2. The method of claim 1, wherein the offer is formatted according to a Session Description Protocol (SDP).

3. The method of claim 1, wherein the offer further comprises a first rank identifier associated with the at least one window.

4. The method of claim 3, wherein the multimedia communication session is a video conference and the first rank identifier indicates that the at least one window will display a participant that is a most recent active speaker.

5. The method of claim 3, wherein a second rank identifier indicates that the at least one window will display a second participant that is a second most recent active speaker.

6. The method of claim 5, wherein the second rank identifier indicates that the at least one window will always display the same participant.

7. The method of claim 3, wherein the first rank identifier indicates that a second window will always display the same participant.

8. A communication device, comprising:
a non-transitory computer readable medium;
a processor; and
an application stored in the computer readable medium and running on the processor, wherein the application:
  receives an offer for a multimedia communication session, the offer comprising:
    a first window identifier for a first window, a bandwidth limit identifier for the first window, and a first group identifier for the first window;
    a second window identifier for a second window, a second bandwidth limit identifier for the second window, and a second group identifier for the second window, wherein the first group identifier is assigned a higher priority than the second group identifier, the higher priority indicating that resolution reductions should be applied to content for display in the second window before resolution reductions are applied to content for display in the first window;
  in response to receiving the offer, delivers an answer to a network for transmission;
  in response to a bandwidth constraint, reduces the resolution of content, for display in the second window up to the second bandwidth limit;
  in response to the bandwidth constraint, reduces the resolution of content, for display in the first window up to the first bandwidth limit, wherein the bandwidth constraint indicates a percentage of an original resolution for the higher priority group and the lower priority group; and
  delivers video content to a network for transmission and for displaying in the first window and the second window.

9. The communication device of claim 8, wherein the offer and the answer is formatted according to a Session Description Protocol (SDP).

10. The communication device of claim 8, wherein the communication device is a server and the multimedia communication session is a video conference.

11. A computer readable medium including computer executable instructions stored onto the computer readable medium which, when executed by one or more processors of a computer, causes the computer to perform a method of negotiating a multimedia session, the method comprising:
  generating an offer for a multimedia communication session, the offer comprising a window content specification, wherein the window content specification comprises a higher priority group identifier that is assigned a higher priority than a lower priority group identifier, the higher priority indicating that resolution reductions should be applied to content for display in windows of the lower priority group before resolution reductions are applied to content for display in windows of the higher priority group, wherein the window content specification comprises a first bandwidth limit identifier indicating a limit for reducing the resolution of video content for display in windows of the lower priority group, wherein the first bandwidth limit identifier indicates a percentage of an original resolution for the lower priority group, wherein the window content specification comprises a second bandwidth limit identifier indicating a limit for reducing the resolution of video content for display in windows of the higher priority group, and wherein the second bandwidth limit identifier indicates a percentage of an original resolution for the higher priority group;
  delivering the offer to a network for transmission to a server;
  receiving an answer to the offer from the server; and
  receiving video content for displaying in the plurality of windows.

12. The computer readable medium of claim 11, wherein the offer is formatted according to a Session Description Protocol (SDP).

13. The computer readable medium of claim 11, wherein the offer further comprises a first rank identifier associated with at least one window.

14. The computer readable medium of claim 13, wherein the multimedia communication session is a video conference and the first rank identifier indicates that the at least one window will display a participant that is a most recent active speaker.

15. The computer readable medium of claim 13, wherein a second rank identifier indicates that the at least one window will display a second participant that is a second most recent active speaker.

16. The computer readable medium of claim 15, wherein the second rank identifier indicates that the at least one window will always display the same participant.

17. The computer readable medium of claim 13, wherein the first rank identifier indicates that a second window will always display the same participant.

18. The communication device of claim 8, wherein the offer further comprises a first rank identifier associated with at least one window.

19. The communication device of claim 18, wherein the multimedia communication session is a video conference and the first rank identifier indicates that the at least one window will display a participant that is a most recent active speaker.

20. The communication device of claim 18, wherein a second rank identifier indicates that the at least one window will display a second participant that is a second most recent active speaker.

* * * * *